(12) United States Patent
Chase et al.

(10) Patent No.: US 12,370,119 B2
(45) Date of Patent: Jul. 29, 2025

(54) WARNING DOME DEVICE AND MANUFACTURE METHOD THEREOF

(71) Applicants: Sydney D Chase, Glendora, CA (US); Larry Harden, Glendora, CA (US); Rolance Mehserdjian, Glendora, CA (US)

(72) Inventors: Sydney D Chase, Glendora, CA (US); Larry Harden, Glendora, CA (US); Rolance Mehserdjian, Glendora, CA (US)

( * ) Notice: Subject to any disclaimer, the term of this patent is extended or adjusted under 35 U.S.C. 154(b) by 0 days.

(21) Appl. No.: 18/528,625

(22) Filed: Dec. 4, 2023

(65) Prior Publication Data

US 2024/0180771 A1 Jun. 6, 2024

Related U.S. Application Data

(60) Provisional application No. 63/429,885, filed on Dec. 2, 2022.

(51) Int. Cl.
| | |
|---|---|
| *A61H 3/06* | (2006.01) |
| *B28B 1/14* | (2006.01) |
| *B28B 7/00* | (2006.01) |

(52) U.S. Cl.
CPC .............. *A61H 3/066* (2013.01); *B28B 1/14* (2013.01); *B28B 7/0064* (2013.01); *A61H 2201/169* (2013.01)

(58) Field of Classification Search
CPC .... A61H 3/066; A61H 2201/169; B28B 1/14; B28B 7/0064

USPC .............. 404/15, 19, 34, 35, 42, 72
See application file for complete search history.

(56) References Cited

U.S. PATENT DOCUMENTS

| | | | | |
|---|---|---|---|---|
| 1,465,539 | A * | 8/1923 | Grosvenor | E04F 15/00 52/366 |
| 3,340,660 | A * | 9/1967 | Arcari | B28B 19/0053 264/261 |
| 4,715,743 | A * | 12/1987 | Schmanski | E01C 5/18 428/167 |
| 6,102,613 | A * | 8/2000 | Medico, Jr. | E01C 19/48 404/71 |
| 6,267,531 | B1 * | 7/2001 | Clarke | E01C 5/08 404/34 |
| 6,890,124 | B2 * | 5/2005 | Provenzano, III | A61H 3/066 404/73 |
| 6,960,989 | B1 * | 11/2005 | Grayson | A61H 3/066 340/407.1 |
| 7,740,413 | B1 * | 6/2010 | Grayson | A61F 9/08 404/94 |
| 7,827,928 | B2 * | 11/2010 | Shaw | E01C 5/20 404/19 |

(Continued)

*Primary Examiner* — Raymond W Addie
(74) *Attorney, Agent, or Firm* — Innovent Law P.C.; Karima F. Gulick

(57) ABSTRACT

A patterned warning mat according to the present disclosure having a base and a plurality of domes and patterns formed on the base. The warning mat is obtained by a process comprising the steps of providing an open-face mold having a plurality of textures and a plurality of dome indentations, preparing a liquid mixture capable of solidifying, pouring the mixture over the open-face mold, and allowing the mixture to solidify and form the warning mat. The domes and patterns on the warning mat respectively correspond to the dome indentations and textures of the open-face mold.

19 Claims, 10 Drawing Sheets

(56) References Cited

U.S. PATENT DOCUMENTS

| | | | | |
|---|---|---|---|---|
| 7,955,024 | B2* | 6/2011 | Driscoll | E01C 5/16 |
| | | | | 52/177 |
| 8,439,596 | B1* | 5/2013 | Dvoracek | E01C 5/20 |
| | | | | 52/177 |
| 8,920,266 | B2* | 12/2014 | Takeuchi | A63B 60/54 |
| | | | | 473/409 |
| 9,398,996 | B2* | 7/2016 | Sippola | E01C 5/16 |
| 9,895,284 | B2* | 2/2018 | Henshue | E01C 5/001 |
| 10,497,228 | B2* | 12/2019 | Novick | E01C 5/06 |
| 10,920,378 | B2* | 2/2021 | Meyers | B21D 22/02 |
| 2006/0045619 | A1* | 3/2006 | Weiss | E01C 5/00 |
| | | | | 404/34 |
| 2006/0227009 | A1* | 10/2006 | Koehn | E01F 9/529 |
| | | | | 340/925 |
| 2007/0086859 | A1* | 4/2007 | Julnes | A61H 3/066 |
| | | | | 404/19 |
| 2007/0092335 | A1* | 4/2007 | Wehmeyer | E01C 5/00 |
| | | | | 404/19 |
| 2014/0017007 | A1* | 1/2014 | Allen | E01C 11/18 |
| | | | | 404/134 |
| 2017/0252256 | A1* | 9/2017 | Henshue | E01C 5/20 |
| 2024/0325232 | A1* | 10/2024 | Wagstaff | A61H 3/066 |

* cited by examiner

WARNING DOME DEVICE AND MANUFACTURE METHOD THEREOF

CROSS-REFERENCE TO RELATED APPLICATIONS

This application incorporates by reference and claims the benefit of priority to U.S. Provisional Application 63/429,885 filed on Dec. 2, 2022.

FIELD OF THE INVENTION

The present disclosure generally relates to tactile warning dome devices, and specifically to shapes, materials, and methods of manufacture of such devices.

BACKGROUND OF THE INVENTION

The American's With Disabilities Act, Chapter Seven, Communication Elements and Features, sections 705.1.1, 705.1.2 and 705.1.3 define the truncated dome size, dome spacing and contrast requirements for the design and installation of a tactile and visual warning system to aid visually impaired individuals in the location of edge of pavement/sidewalk transitions. Section 705.2 defines the surface section and location(s) where the tactile warning system is to be installed. This section provides for the correct truncated dome size, spacing and contrast requirements of the Act as well as an accurate means of locating the truncated domes as prescribed.

A pedestrian with visual impairment may feel a safety dome pattern with their feet (or may even hear the sound of the safety domes if they are driving) thereby alerting them that they are entering an area of potential danger, such as intersections, crosswalks, highway center lanes, danger zones, sidewalks, walkways, platforms, public transit stations, etc. Pedestrians that have some type of disability need to have a warning system in place to alert them of the potential danger.

There is a need in public transit facilities and streets for pedestrians to be able to detect the locations of potential hazards. By making the pedestrian aware of a potential hazard, safety domes allow the pedestrian or driver to avoid the potential hazard. The hazardous areas could include sidewalks, curb ramps, crosswalks, stairways, railroad crossings, subways platforms, loading docks, stages, bus loading platforms, man holes, potholes, construction area dangers, road edge warnings, intersections, highways center lanes, etc.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

The embodiment and various embodiments can now be better understood by turning to the following detailed description of the embodiments, which are presented as illustrated examples of the embodiments defined in the claims. It is expressly understood that the embodiments as defined by the claims may be broader than the illustrated embodiments described below. Many alterations and modifications may be made by those having ordinary skill in the art without departing from the spirit and scope of the embodiments.

The present disclosure relates to a textured warning mat having domes and configured to be placed on walkways, crosswalks, and other areas of pedestrian traffic for providing direction and warning to visually handicapped persons. The present disclosure also relates to a method of manufacturing said textured warning dome mat.

Figure 1:
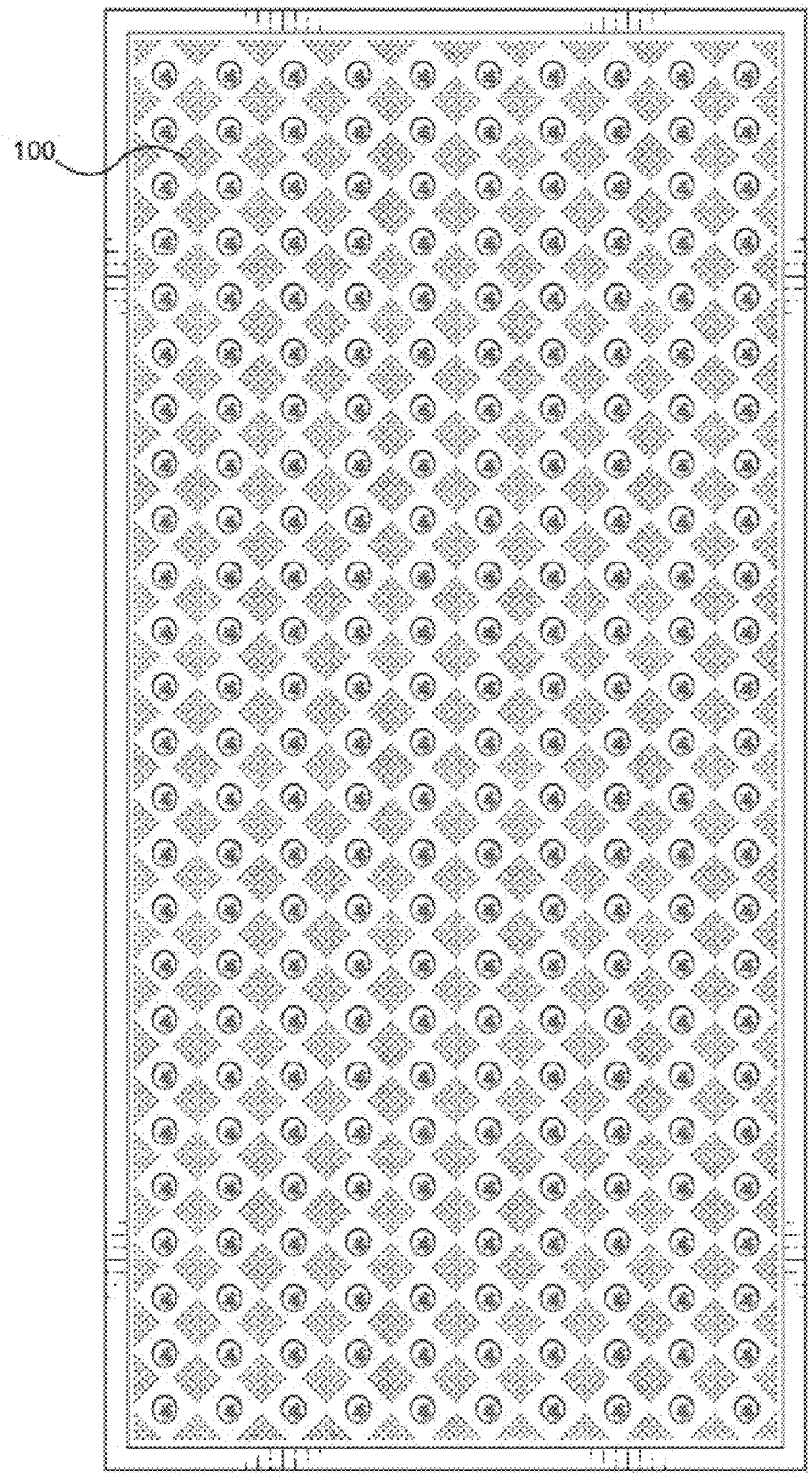
FIG. 1 illustrates a top view of an open-face mold according to one embodiment of the present disclosure.
Figure 2:
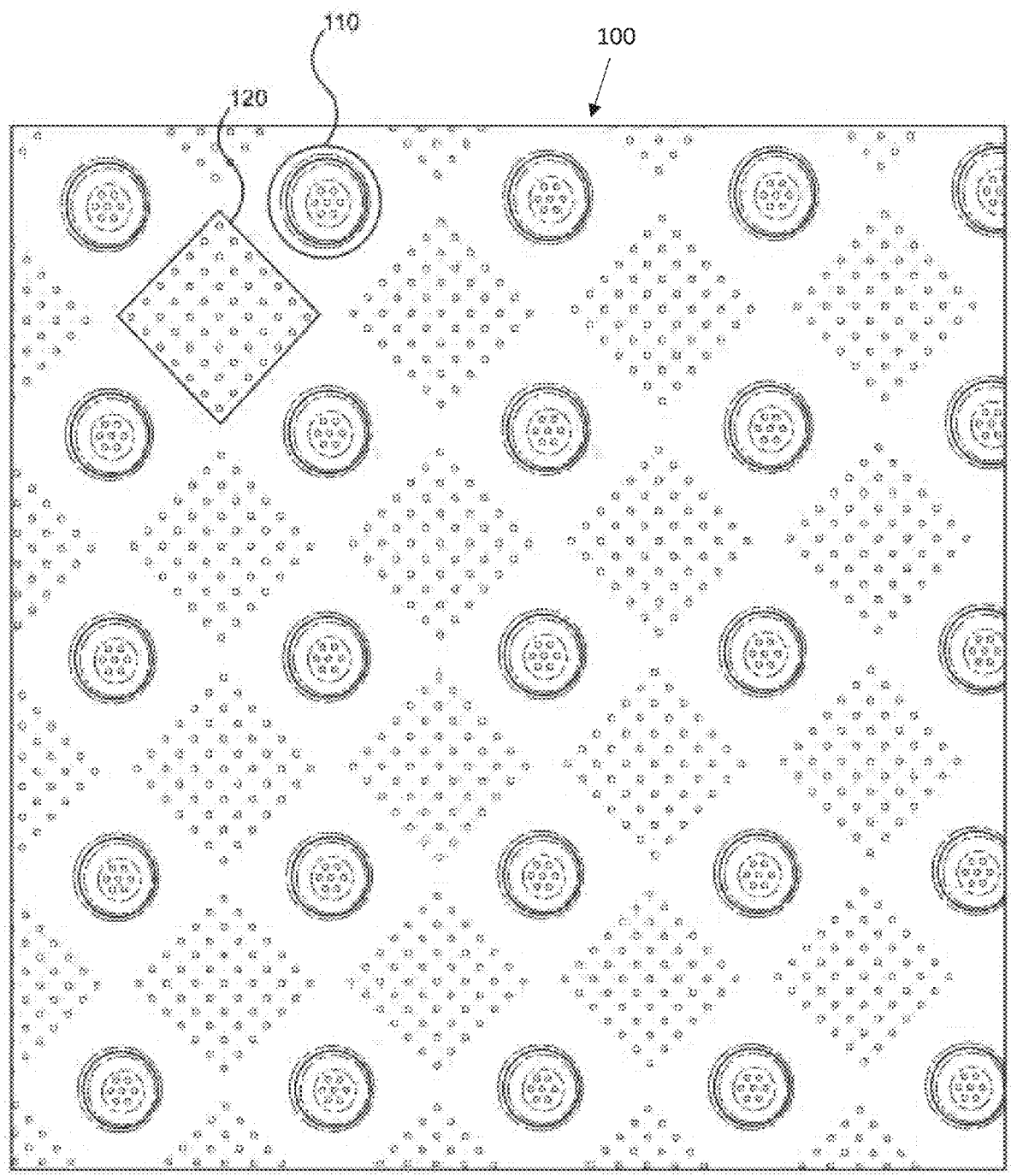
FIG. 2 is an enlarged top view of the open-face mold according to the embodiment of the present disclosure illustrated in FIG. 1.

FIG. 1 illustrates a perspective view of an open-face mold 100 according to one embodiment of the present disclosure. FIG. 2 is an enlarged top view of the open-face mold 100. As illustrated in FIGS. 1 and 2, the open-face mold 100 includes first domes 110 and first textures 120 distributed over the surface of the open-face mold 100. The purpose of the first domes 110 and first textures 120 is to accommodate and contain liquid mixture poured over the open-face mold 100, so that once the liquid mixture solidifies its surface will have patterns corresponding to the shapes of the first domes 110 and the first textures 120.

The first dome 110 of the present embodiment is a sunken half-sphere space with a plurality of tiny openings in the middle. In the present embodiment, the first dome 110 is formed by first drilling a few openings on a metal sheet and then pressing or punching on the metal sheet to form the sunken half-sphere space. However, in different embodiments, the first dome 110 can be formed as part of a plastic open-face mold made using injection open-face molding method or other plastic open-face molding methods. On the other hand, the first texture 120 of the present embodiment is formed by a plurality of tiny openings distributed in substantially a diamond shape. The first texture 120 can be formed by drilling specific number of openings in a diamond shape. In other embodiments, the first texture 120 can be formed as part of a plastic open-face mold using injection open-face molding method or other plastic open-face molding methods.

Further, as illustrated in FIG. 2, the first texture 120 is located between four adjacent first domes 110. Similarly, the first dome 110 is located between four adjacent first textures 120.

Further, in the present embodiment, the open-face mold 100 is made of metal. However, in different embodiments, the open-face mold 100 can be made of plastics using injection open-face molding method or other suitable methods known in the art to have the shape and textures illustrated in FIGS. 1 and 2.

Figure 3:
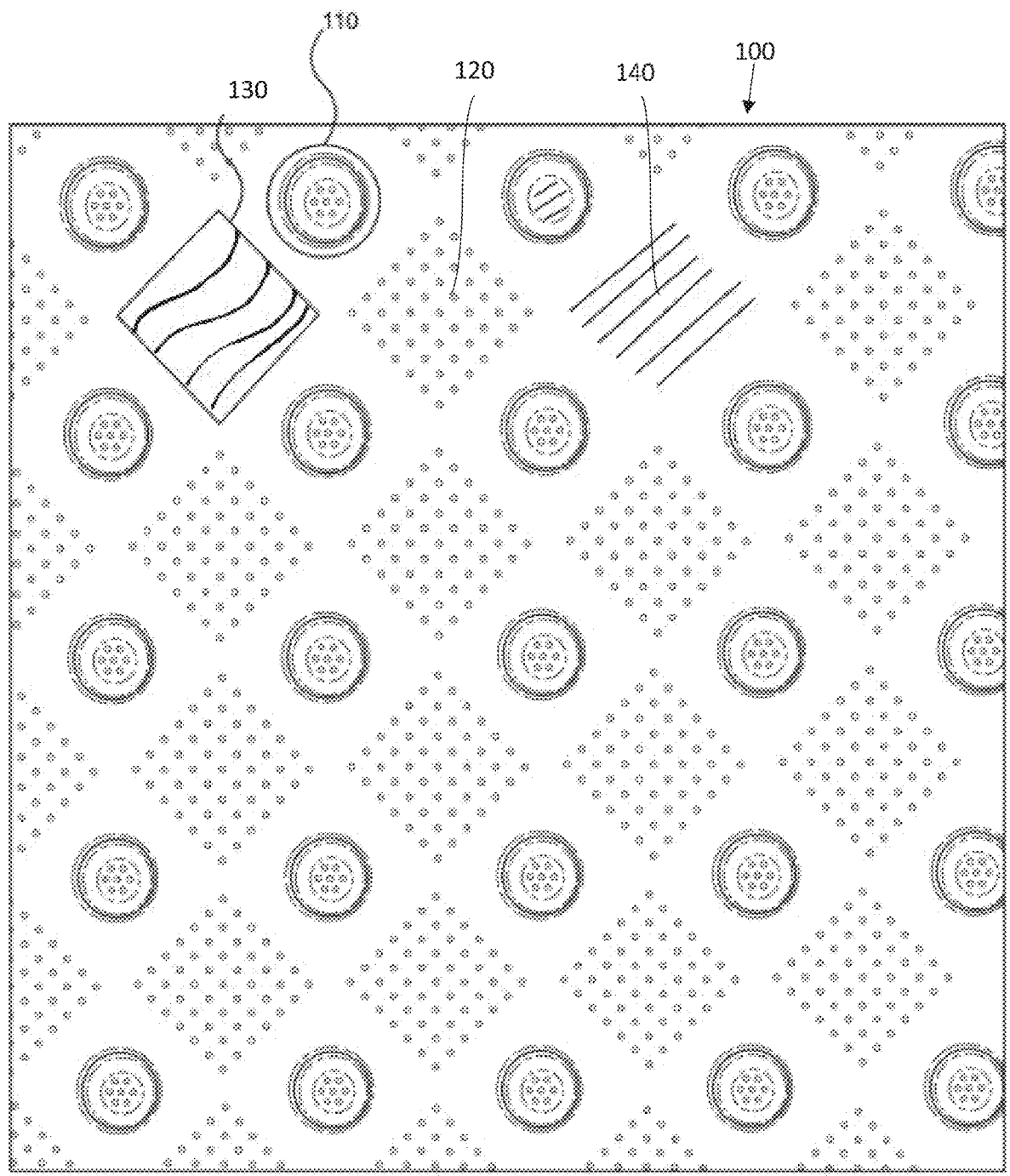
FIG. 3 is an enlarged top view of the open-face mold according to another embodiment of the present disclosure.

FIG. 3 illustrates an enlarged top view of an open-face mold 100 according to another embodiment of the present disclosure. The open-face mold 100 includes first domes 110, first textures 120, second textures 130, and third textures 140 distributed over the surface of the open-face mold 100. The purpose of the four different domes and textures 110, 120, 130, 140 is to accommodate liquid mixture poured over the open-face mold 100, so that once the liquid mixture solidifies its surface will have patterns corresponding to the shapes of the corresponding domes and textures 110, 120, 130, 140.

The first domes 110 and first textures 120 in FIG. 3 are substantially identical to the ones in FIG. 2 and thus will not be elaborated again. The second textures 130 includes a plurality of narrow and curved cuts formed on the surface of the open-face mold 100. The cuts of the second textures 130 can be formed by chemical etching process, mechanically scratching the surface of the open-face mold 100 using tools, or other known methods in the art to form cuts on metallic or plastic molds. The third textures 140 includes a plurality of narrow and substantially straight cuts formed on the surface of the open-face mold 100. The cuts of the third textures 140 can also be formed by chemical etching process, mechanically scratching the surface of the open-face mold 100 using tools, or other known methods known in the art to form cuts on metallic or plastic molds.

In the embodiment illustrated in FIG. 3, the open-face mold 100 includes four textures with different shapes and sizes. In different embodiments, the open-face mold 100 can have only first domes 110, first textures 120, second textures 130 on its surface or include even more textures different from the ones illustrated in FIG. 3.

Figure 4:
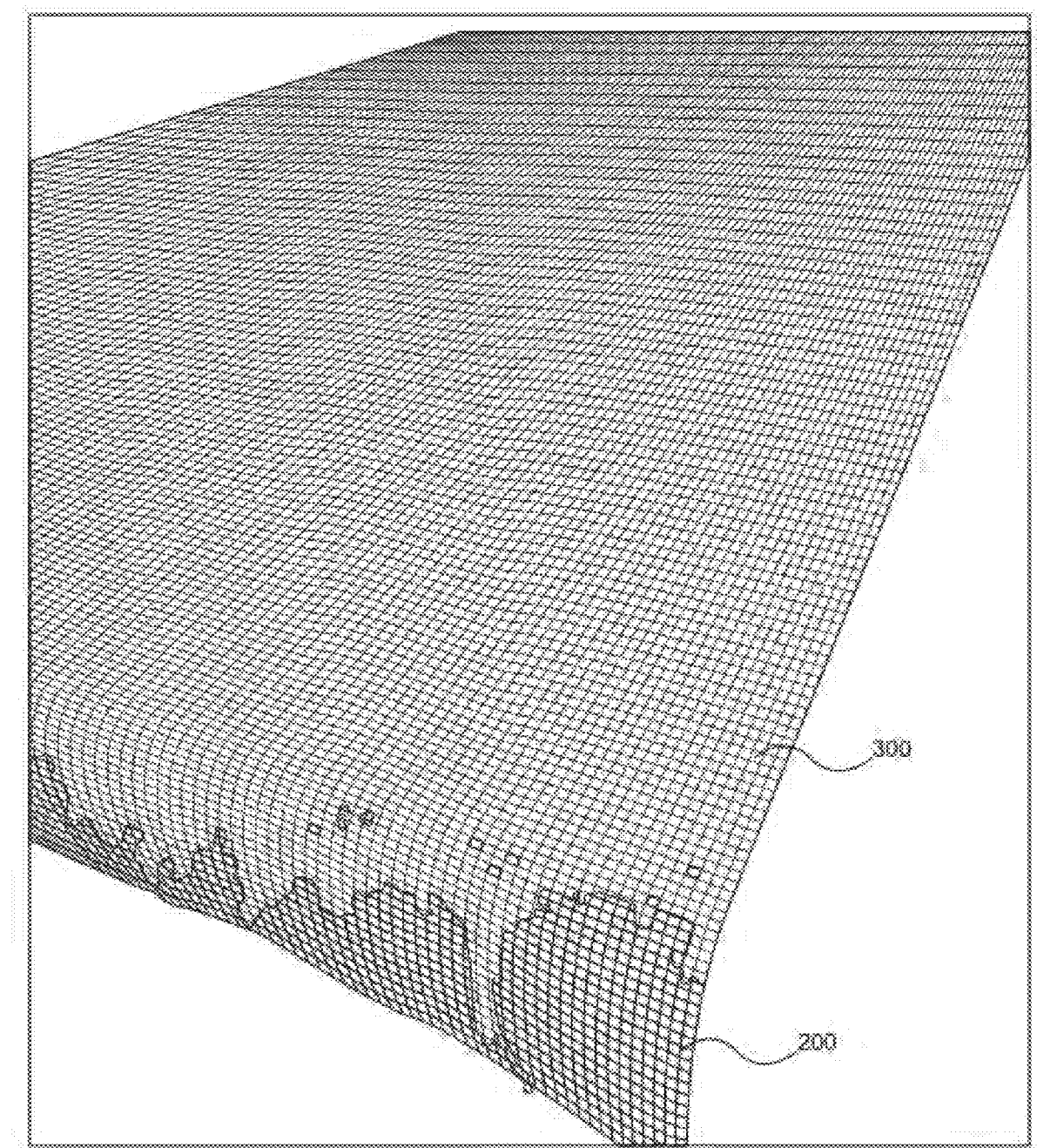
FIG. 4 is a perspective view of the mesh layer with liquid mixture poured thereon, according to one embodiment of the present disclosure.
Figure 5:
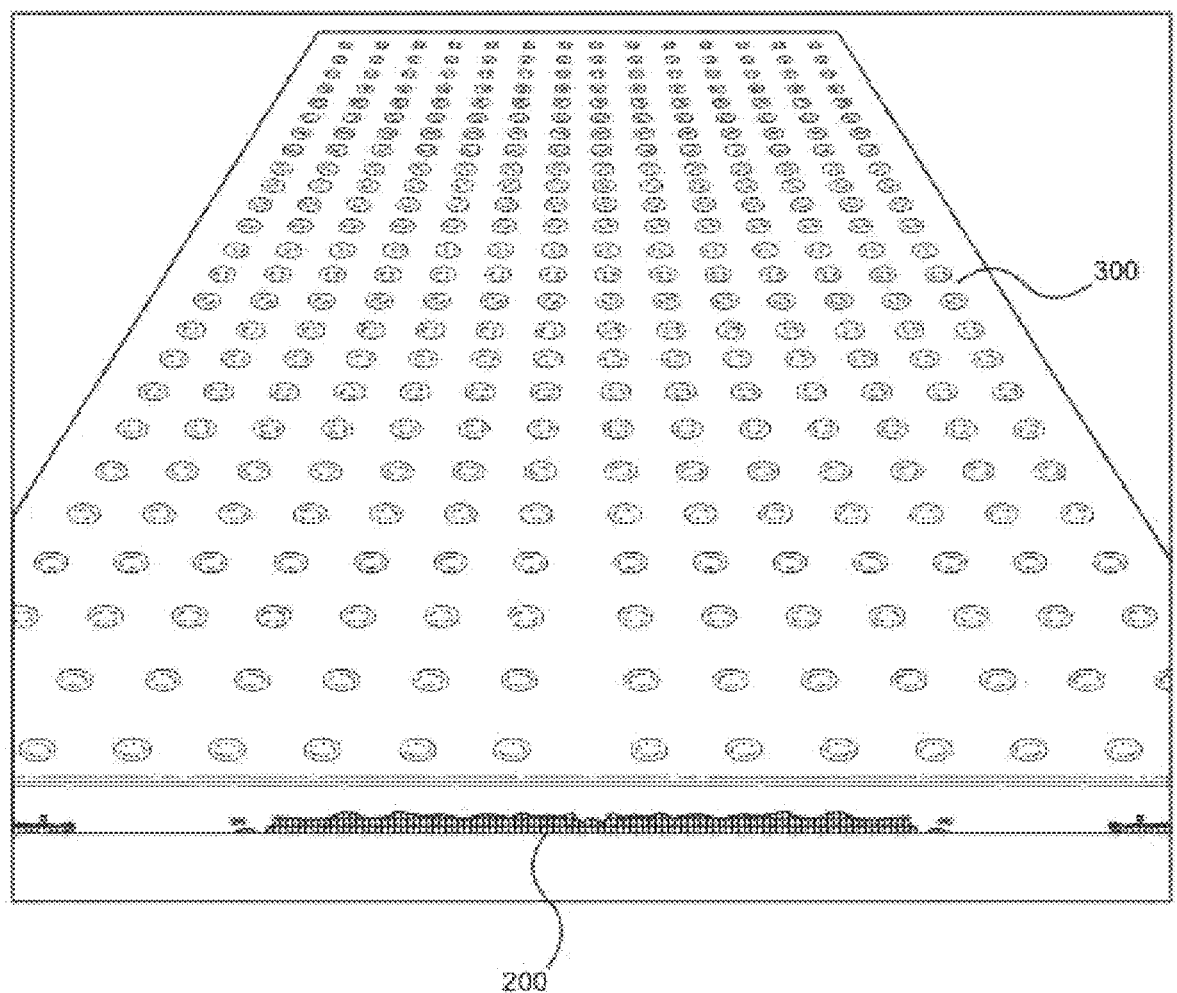
FIG. 5 is a perspective view of the mesh layer with colored liquid mixture poured thereon, according to one embodiment of the present disclosure.

FIGS. 4-5 are perspective views of the mesh layer 200 with liquid mixture poured thereon. As illustrated in FIGS. 4-5, the mesh layer 200 is a flexible and porous screen having a plurality of pores. In the present embodiment, a liquid mixture 300 is first poured over the open-face mold to subsequently accumulate in the domes and textures 110, 120 on the open-face mold 100. However, before the mixture solidifies, the mesh layer 200 is laid over both the open-face mold 100 and the mixture 300. At this moment, the mixture 300 is still in the liquid state and thus will pass through the pores of the mesh layer 200 and immerse the mesh layer 200 in the process. Tools such as float or margin trowel can be used to evenly distribute and smooth the mixture over the open-face mold 100 and the mesh layer 200 before the mixture solidifies. Also, the area of the mesh layer 200 is preferably greater than that of the open-face mold 100, to ensure that the entire area of the open-face mold 100 is fully covered by the mesh layer 200.

The liquid mixture 300 is then allowed to solidify to eventually form a textured warning mat. The part of liquid mixture 300 that occupies the first domes 110 of the open-face mold 100 solidifies to have shape corresponding to the first domes 110. Similarly, the part of liquid mixture 300 that occupies the first textures 120 of the open-face mold 100 solidifies to have shape corresponding to the first textures 120. Further, the part of liquid mixture 300 that fills the pores of the mesh layer 200 eventually solidifies and form a thin base that preferably fully contains the mesh layer 200. In other words, the mesh layer 200 is preferably embedded within the cured liquid mixture 300. The solidification process preferably takes 5 to 10 minutes for the liquid mixture 300 to dry up and form the warning mat. However, in different embodiments, the process may take longer or less time depending on the ingredients used to create the liquid mixture 300.

In another embodiment, before a liquid mixture is poured over the open-face mold 100, the mesh layer 200 is first laid over the open-face mold 100 (not illustrated in FIGS. 4-5). Once the open-face mold 100 is covered by the mesh layer 200, a liquid mixture 300 is poured over at least the part of the mesh layer 200 above the open-face mold 100. Part of the liquid mixture 300 will pass through the pores of the mesh layer 200 and then accumulate in the first domes 110 and the first textures 120 of the open-face mold 100. The liquid mixture 300 eventually immerse the mesh layer 200. Tools such as float or margin trowel can be used to evenly distribute and smooth the mixture over the open-face mold 100 and the mesh layer 200 before the mixture solidifies.

The liquid mixture 300 is then allowed to solidify to eventually form a textured warning mat. The portion of liquid mixture 300 that occupies the first domes 110 of the open-face mold 100 solidifies to have shape corresponding to the first domes 110. Similarly, the portion of liquid mixture 300 that occupies the first textures 120 of the open-face mold 100 solidifies to have shape corresponding to the first textures 120. Further, the part of liquid mixture 300 also forms a thin base that preferably contains the mesh layer 200. In other words, the mesh layer 200 is immersed and embedded within the cured liquid mixture 300. The solidification process preferably takes 5 to 10 minutes for the liquid mixture 300 to dry up (or cool down) and form the warning mat. However, in different embodiments, the process may take longer or less time depending on the ingredients used to create the liquid mixture 300.

The liquid mixture 300 of the present embodiment includes cement, resin, and bonding agents (such as clay and water, oil, and sodium silicate), but is not limited thereto. In different embodiments, the liquid mixture 300 can also include glass and sand as well as other materials such as common mineral fillers, glass beads, skid resistant material, and color pigments.

In the embodiment illustrated in FIGS. 4-5, the liquid mixture 300 does not contain color pigments. To add color, the cured mixture 300 is removed from the open-face mold 100 and then colored/painted with the desired color pigments. However, in other embodiments such as the one illustrated in FIGS. 4-5, color pigments can be added to the liquid mixture 300 to eliminate the step of coloring/painting the cured mixture 300 after removal from the open-face mold 100. Also, the mixture can be a polymer mixture or an acrylic mixture, depending on the materials used to make the liquid mixture 300.

Figure 6:
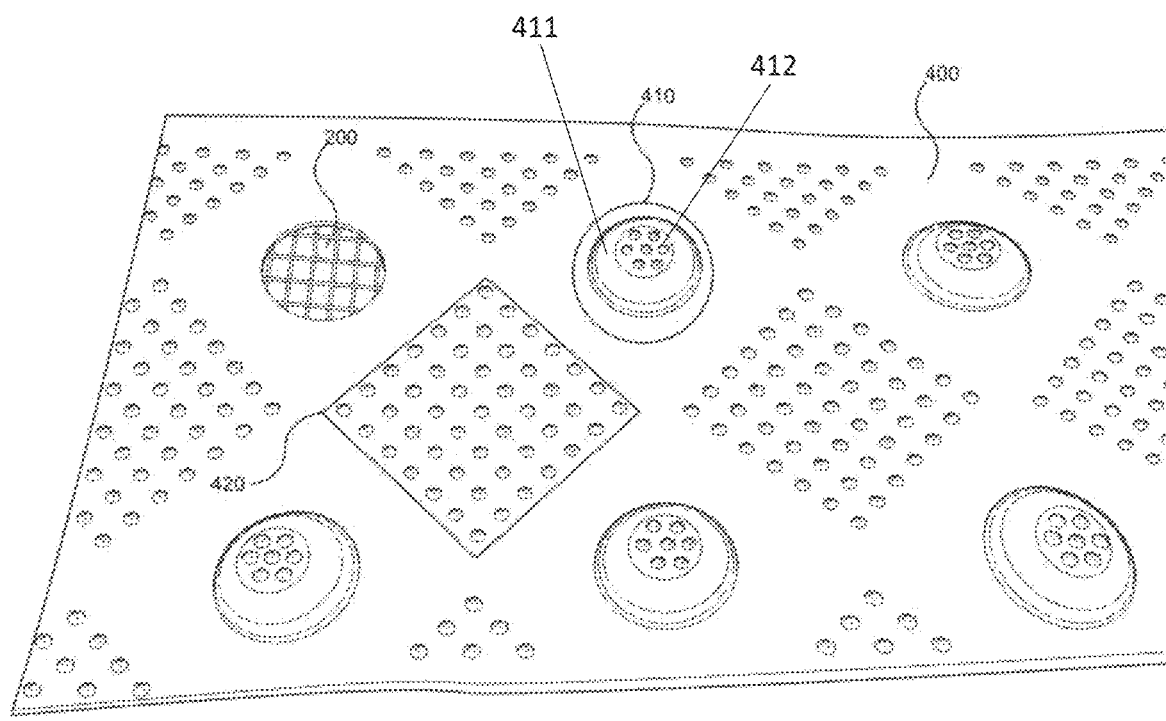
FIG. 6-7 are perspective view and enlarged perspective view of the textured warning mat according to one embodiment of the present disclosure.
Figure 7:
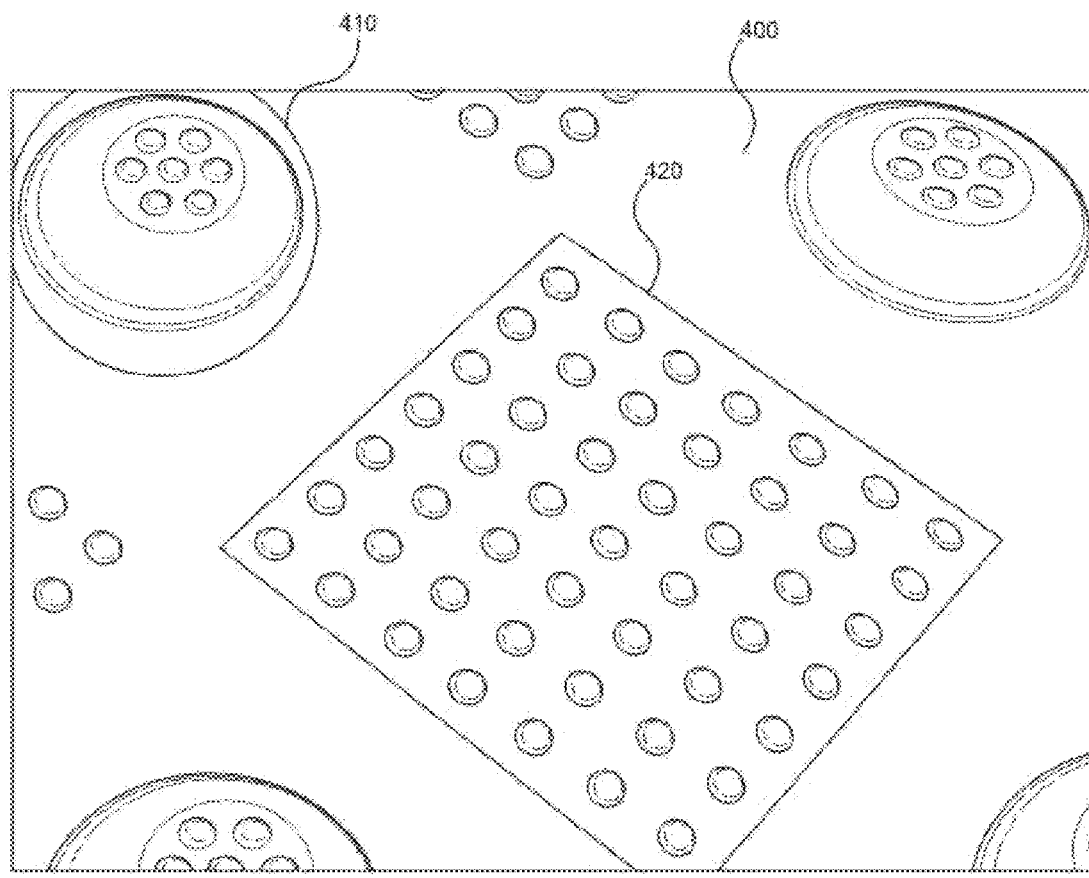

FIGS. 6-7 are respectively a perspective view and an enlarged perspective view of the textured warning mat according to one embodiment of the present disclosure. As illustrated in FIGS. 6-7, the warning mat includes a base 400, a second dome 410, and a first pattern 420. The shape of the second domes 410 substantially corresponds to that of the first domes 110 of the open-face mold 100 illustrated in FIGS. 1-2. Similarly, the shape of the first patterns 420 substantially corresponds to that of the first textures 120 of the open-face mold 100 illustrated in FIGS. 1-2. The second dome 410 includes a dome structure 411 and a plurality of protrusions 412 on the dome structure 411. The dome structure 411 and protrusions 412 are both configured to provide auditory and tactile underfoot feedback for the visually impaired. In addition, the protrusions 412 are designed to increase the friction between the pedestrian's shoe and the warning mat to make the warning mat more skid-resistant.

As illustrated in FIG. 6, one of the second domes 410 is removed to reveal the mesh layer 200 within the base 400. The mesh layer 200 gives flexibility to the warning mat so that it can be laid over uneven surface. Further, the bond between the cured mixture and the mesh layer 200 also maintains the integrity of the warning mat and keeps the warning mat from breaking down due to external forces.

In the embodiment illustrated in FIGS. 6-7, the warning mat has two surfaces on the two opposite sides of the base 400. The first surface is disposed with the second domes 410 and the first patterns 420 and is the surface that physically interacts with the pedestrians. On the other hand, the second surface is the one adhered to the road using adhesives. In one embodiment, the adhesive is water-based acrylic adhesives. However, in different embodiments, rubber/resin adhesives, thermosetting rubber/resin adhesives, precured rubber/resin adhesives, solvent based adhesives, silicone adhesives, heat activated adhesives, thermal release adhesives, electrically conductive/anti-static adhesives, thermally conductive adhesives, or other suitable adhesives can be used to stick the textured warning mat of the present disclosure to wood, asphalt, and concrete.

Further, mechanical tools or chemical substances can be used to form patterns, similar to the cuts of the second textures 130 and third textures 140 illustrated in FIG. 3, on the surface of the textured warning mat removed from the open-face mold.

Figure 8:
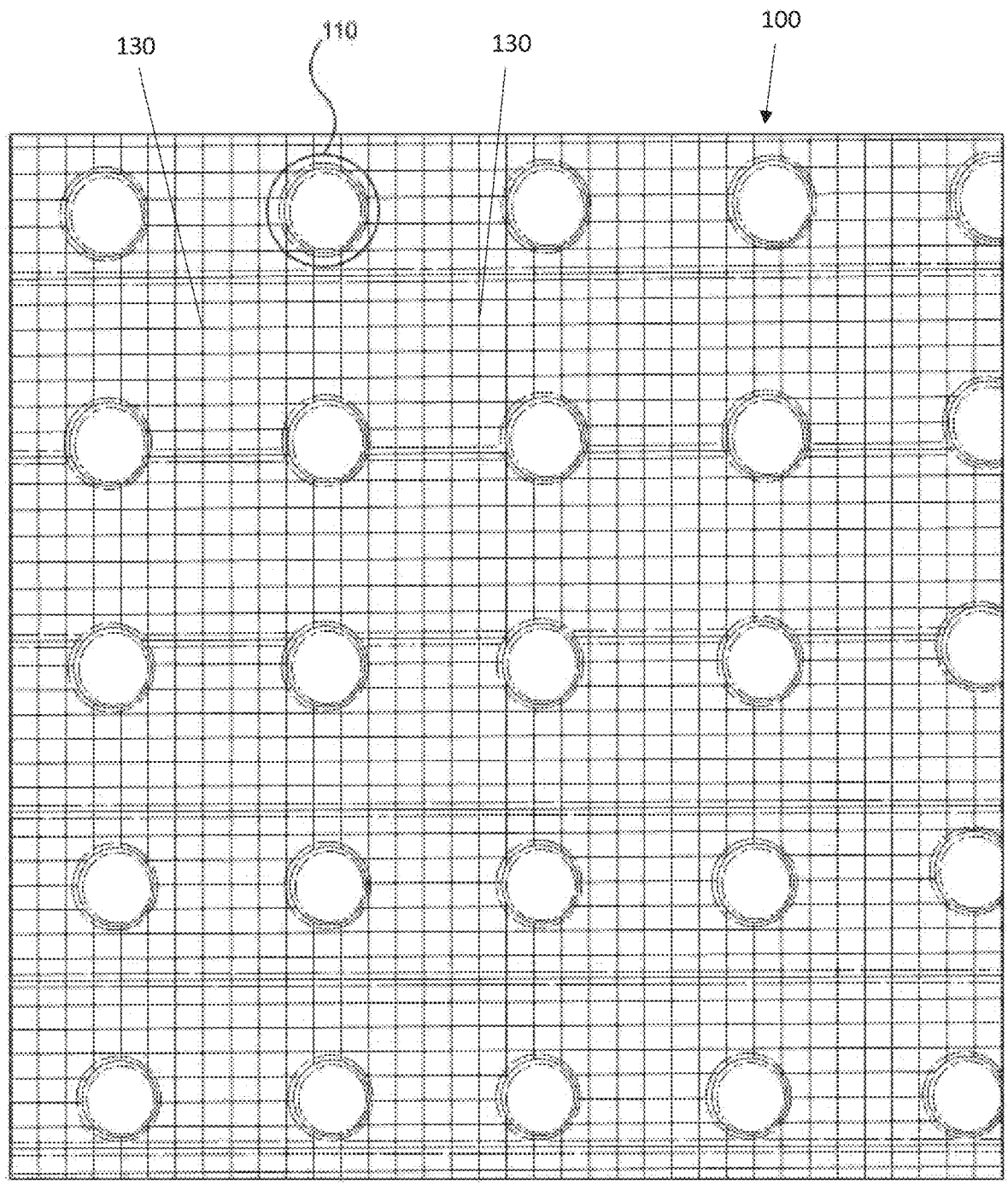
FIGS. 8-9 are top view and perspective view of the textured warning mat according to another embodiment of the present disclosure.
Figure 9:
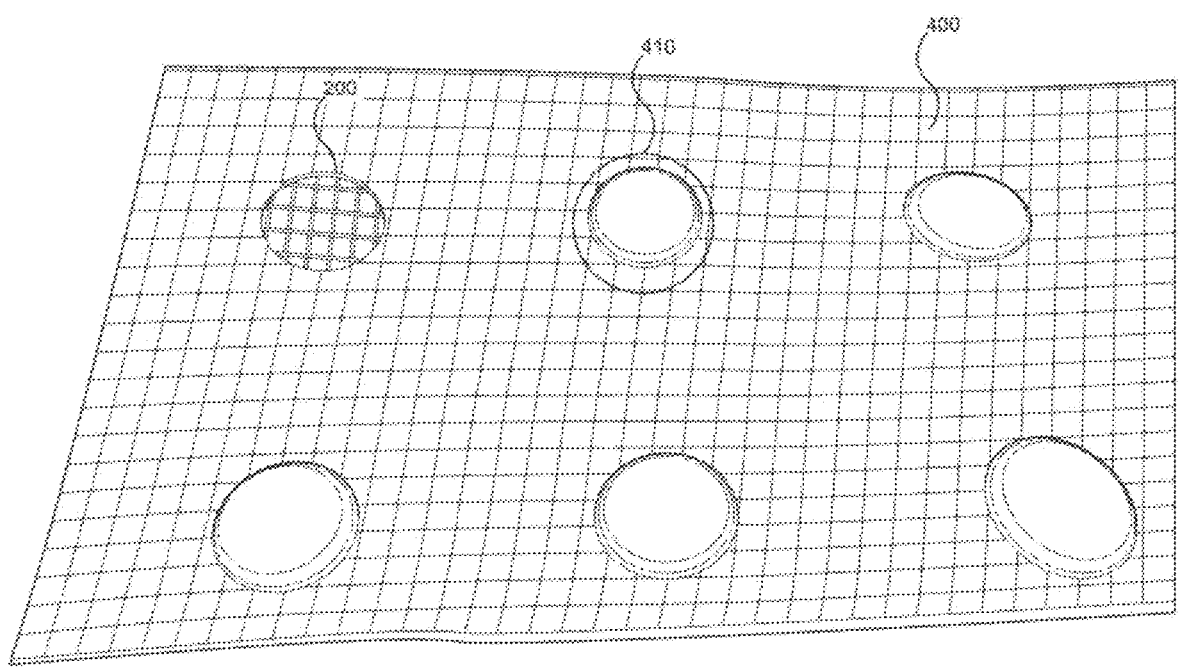

FIG. 8 is a top view of the open-face mold 100 according to yet another embodiment of the present disclosure. FIG. 9 is a partial perspective view of the warning mat according to the same embodiment as FIG. 8. The open-face mold 100 also includes a plurality of first domes 110 similar to the ones illustrated in FIG. 2. The open-face mold 100 also includes a plurality of second textures 130 distributed on the surface of the open-face mold 100. In the present embodiment, the second textures 130 are linear grooves that cross one another.

Figure 10:
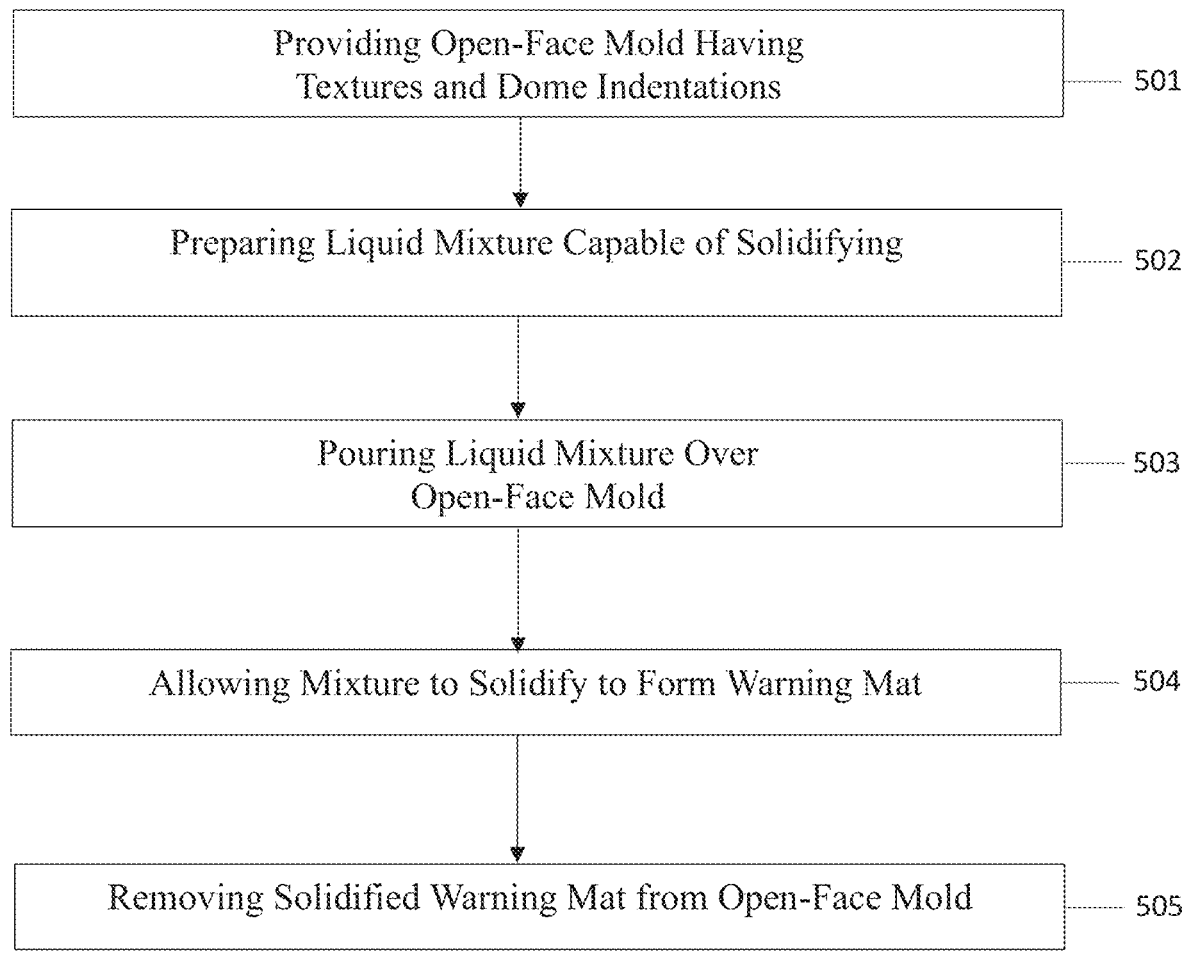
FIG. 10 is a flow chart of the method of manufacturing a patterned warning mat according to one embodiment of the present disclosure.

FIG. 10 is a flow chart of the method of manufacturing a patterned warning mat configured to be placed on walkways, crosswalks, and other areas of pedestrian traffic for providing direction and warning to visually handicapped persons, according to one embodiment of the present disclosure. The method includes step 501 of providing an open-face mold having a plurality of textures and a plurality of dome indentations. In the present embodiment, each of dome indentations has a base diameter of 23 mm (0.9 in) minimum to 36 mm (1.4 in) maximum, a top diameter of 50 percent of the base diameter minimum to 65 percent of the base diameter maximum, and a height of 5 mm (0.2 in). Further, the dome indentations have substantially a center-to-center spacing of 41 mm (1.6 in) minimum and 61 mm (2.4 in) maximum, and a base-to-base spacing of 17 mm (0.65 in) minimum, measured between the most adjacent domes. In other embodiments, the dome indentations can have other sizes or spacing depending on the government regulations on dome size and spacing.

In one embodiment, the textures on the open-face mold includes first textures on the dome indentations and second textures located between four dome indentations. The textures can be openings such as the domes and textures 110, 120 illustrated in FIG. 2. In a different embodiment, the textures can include cuts and holes configured to accommodate liquid mixture poured over the open-face mold, as the textures illustrated in FIG. 3. In yet another embodiment, the textures can be linear grooves such as the second and third textures 130, 140 illustrated in FIG. 3 or any other etchings or textures with depth on the open-face mold.

The method further includes step 502 of preparing a liquid mixture capable of solidifying and chemical reaction. The liquid mixture includes cement, resin, and bonding agents (such as clay and water, oil, and sodium silicate), but is not limited thereto. In different embodiments, the liquid mixture can also include glass and sand as well as other materials such as common mineral fillers, glass beads, skid resistant material, and color pigments. Further, the process of mixing the above-mentioned materials may result in chemical reactions that generate heat as a result and causes a temperature of the liquid mixture to be higher than a room temperature.

The method further includes step 503 of pouring the mixture over the open face open-face mold. The mixture, still in a liquid state, accumulates in the textures of the open-face mold.

The method further includes step 504 of allowing the mixture to solidify and form the warning mat. The part of liquid mixture that occupies the patterns of the open-face mold solidifies to have shape corresponding to the patterns of the open-face mold. The solidification process preferably takes 5 to 10 minutes for the liquid mixture to solidify and form the warning mat. However, in different embodiments, the process may take longer or less time depending on the ingredients used to create the liquid mixture the liquid mixture.

After confirming the warning mat is taking shape and the solidification of mixture is complete, the method then executes step 505 of removing the warning mat from the open-face mold. As mentioned above, the liquid mixture that forms the warning mat may or may not include the pigment with desired color. Thus, in one embodiment, step 505 may further include adding desired color to the warning mat using pigment, after removal from the open-face mold.

Figure 11:
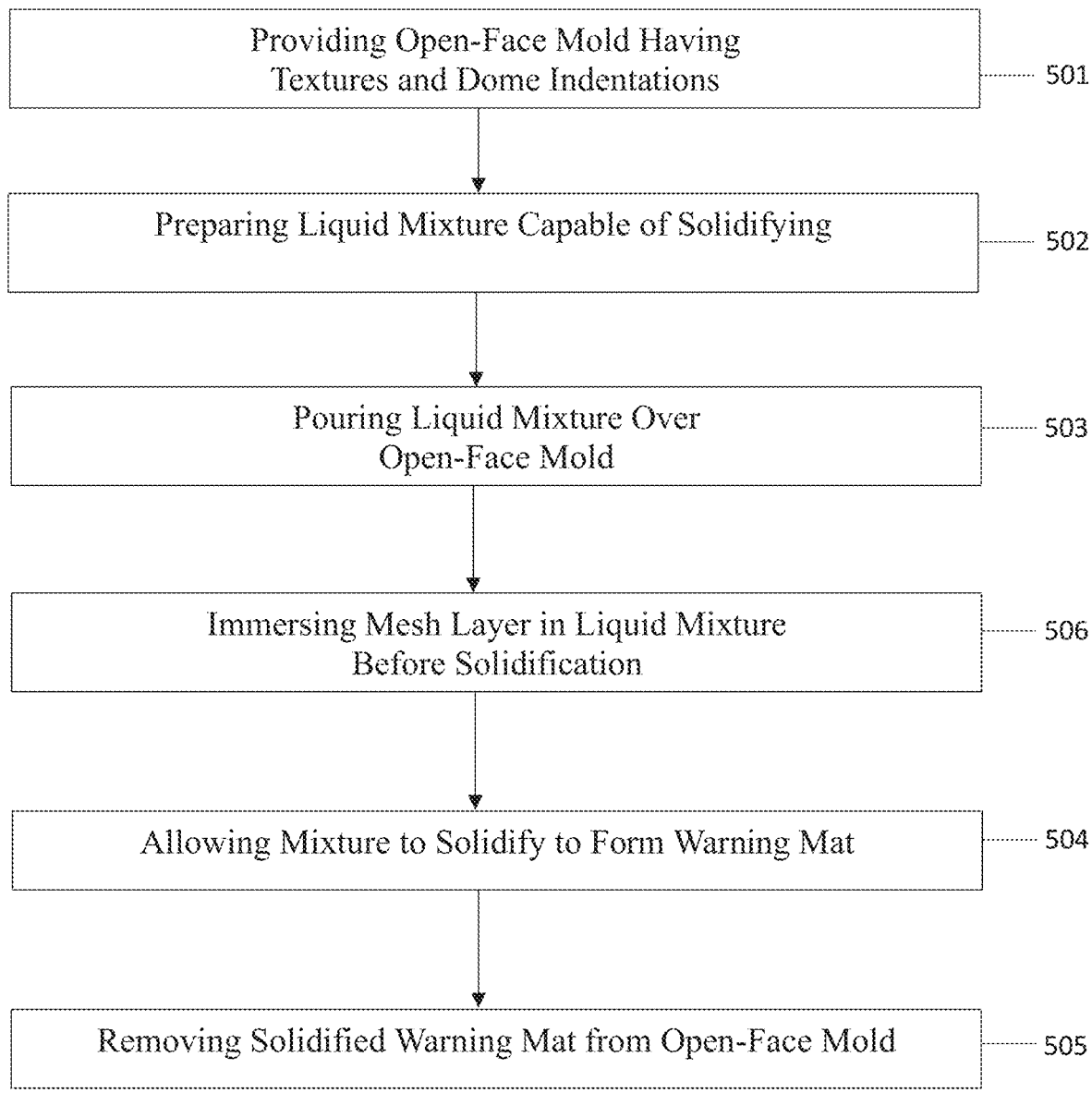
FIG. 11 is a flow chart of the method of manufacturing a patterned warning mat according to another embodiment of the present disclosure.

FIG. 11 is a flow chart of the method of manufacturing a patterned warning mat according to another embodiment of the present disclosure. The method further including step 506 of immersing a mesh layer in the liquid mixture before the liquid mixture solidifies. The mesh layer is a flexible and porous screen having a plurality of pores. In one embodiment, the liquid mixture is first poured over the open-face mold to subsequently accumulate in the textures on the open-face mold. However, before the mixture solidifies, the mesh layer is laid over both the open-face mold and the mixture. At this moment, the mixture is still in the liquid state and thus will pass through the pores of the mesh layer to immerse the mesh layer in the process. Tools such as float or margin trowel can be used to evenly distribute and smooth the mixture over the open-face mold and the mesh layer before the mixture solidifies.

In another embodiment, before a liquid mixture is poured over the open-face mold, the mesh layer is first laid over the open-face mold. Once the open-face mold is at least substantially covered by the mesh layer, a liquid mixture is poured over the mesh layer above the open-face mold. Part of the liquid mixture will pass through the pores of the mesh layer and then accumulate in the textures of the open-face mold. The liquid mixture eventually immerse the mesh layer. Tools such as float or margin trowel can be used to evenly distribute and smooth the mixture over the open-face mold and the mesh layer before the mixture solidifies. Further, mechanical tools or chemical substances can be used to form cuts, similar to the second textures 130 and third textures 140 illustrated in FIG. 3, on the solidified and textured warning mat removed from the open-face mold.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the field.

The invention claimed is:

1. A method of manufacturing a patterned warning mat configured to be placed on walkways, crosswalks, and other areas of pedestrian traffic for providing direction and warning to visually handicapped persons, the method comprising:
   providing an open-face mold having a plurality of dome indentations and textures;
   laying out a mesh layer flat on the mold, the mesh layer has an area greater than an area of the open-face mold;
   preparing a liquid mixture capable of solidifying and chemical reaction;
   pouring the mixture over the open face open-face mold; and
   allowing the mixture to immerse the mesh layer and then solidify to form the warning mat having:
      a continuous and one-piece base;
      the flat mesh immersed within the base and increasing flexibility of the base to facilitate placement over uneven surface;
      a plurality of domes formed on the base and corresponding to the dome indentations; and
      a plurality of patterns formed on the base and corresponding to the textures of the open-face mold; and
   removing the warning mat from the mold.

2. The method of producing a patterned warning mat of claim 1 further comprising a step of etching textures on the mold including:
   providing a plurality of texture options including a first texture;
   etching at least a plurality of the first textures on the mold that correspond to the patterns on the base.

3. The method of producing a patterned warning mat of claim 1, further comprising:
   providing a mesh layer having a plurality of pores;
   laying out the mesh layer on the mixture in order for the mixture to pass through the mesh layer;
   immersing or saturating the mesh layer with the mixture in a liquid state; and
   allowing the mixture to solidify and form the warning mat further having the mesh layer in the base.

4. The method of producing a patterned warning mat of claim 1, further comprising:
   providing a mesh layer having a plurality of pores;
   laying out the mesh layer on the open-face mold, wherein the mesh layer includes a plurality of pores;
   pouring the mixture over the mesh layer, wherein the mixture passes through the pores of the mesh layer and accumulates on the textures of the open-face mold;
   immersing or saturating the mesh layer with the mixture in a liquid state; and
   allowing the mixture to solidify and form the warning mat further having the mesh layer in the base.

5. The method of producing a patterned warning mat of claim 1, wherein the step of preparing the mixture includes:
   mixing cement, resin, and bonding agents to form the mixture; and
   adding a color pigment to the mixture.

6. The method of producing a patterned warning mat of claim 1, further comprising coloring the warning mat with a color pigment having a desired color, wherein the step of preparing the mixture includes mixing cement, resin, and bonding agents to form the mixture.

7. The method of producing a patterned warning mat of claim 1, wherein the step of preparing a mixture includes selectively making a polymer mixture or an acrylic mixture.

8. A patterned warning mat, configured to be placed on walkways, crosswalks, and other areas of pedestrian traffic for providing direction and warning to visually handicapped persons,
   the warning mat having:
      a continuous and one-piece base made of polymer;
      a flat mesh layer embedded within the continuous and one-piece base, the flat mesh layer has an area greater than an area of an open-face mold, and increases flexibility of the base to facilitate placement over uneven surface;
      a plurality of domes formed on the base; and
      a plurality of patterns formed on the.

9. The patterned warning mat of claim 8, wherein the patterns include a plurality of first patterns formed on the base.

10. The patterned warning mat of claim 8, wherein the mesh layer includes a plurality of pores and the base occupies the pores.

11. The patterned warning mat obtained by the process of claim 8, wherein the base includes at least one of polymer mixture and acrylic mixture.

12. The patterned warning mat obtained by the process of claim 8, wherein the base includes cement, resin, bonding agents, and color pigment.

13. The patterned warning mat obtained by the process of claim 8, further including a color pigment applied on the base, the base includes cement, resin, bonding agents, and color pigment.

14. A patterned warning mat, configured to be placed on walkways, crosswalks, and other areas of pedestrian traffic for providing direction and warning to visually handicapped persons, obtained by a process comprising the steps of:
   providing an open-face mold having a plurality of dome indentations and textures;
   laying out a mesh layer flat on the mold, the mesh layer has an area greater than an area of the open-face mold;
   preparing a liquid mixture capable of solidifying;
   pouring the mixture over the open-face mold;

immersing or saturating the mesh layer in the mixture before solidification occurs; and allowing the mixture to immerse the mesh layer and then solidify and form the warning mat having:
  i. a continuous and one-piece base;
  ii. a plurality of domes formed on the base and corresponding to the dome indentations; and
  iii. a plurality of patterns formed on the base and corresponding to the textures of the mold; and
  iv. the flat mesh layer immersed and embedded in the base and increasing flexibility of the base to facilitate placement over uneven surface; and removing the warning mat from the mold.

15. The patterned warning mat obtained by the process of claim 14, wherein the step of immersing the mesh layer with the mixture includes:
  providing a mesh layer having a plurality of pores;
  laying out the mesh layer on the mixture in order for the mixture to pass through the mesh layer and the mesh layer to be at least partially immersed in the mixture;
  immersing or saturating the mesh layer with the mixture in a liquid state; and
  allowing the mixture to solidify and form the warning mat further having the mesh layer immersed in the base.

16. The patterned warning mat obtained by the process of claim 14, wherein the step of immersing the mesh layer with the mixture includes:
  laying out the mesh layer on the open-face mold, wherein the mesh layer includes a plurality of pores; and
  pouring the mixture over the mesh layer, wherein the mixture passes through the pores of the mesh layer and accumulates on the textures of the open-face mold;
  immersing or saturating the mesh layer with the mixture in a liquid state; and
  allowing the mixture to solidify and form the warning mat further having the mesh layer immersed in the base.

17. The patterned warning mat obtained by the process of claim 14, wherein the step of etching textures on the mold includes:
  providing a plurality of texture options including a first texture; and
  etching at least a plurality of the first textures on the mold that correspond to the patterns on the base; and the process further includes:
  immersing or saturating the mesh layer with the mixture in a liquid state; and
  allowing the mixture to solidify and form the warning mat further having the mesh layer in the base.

18. The patterned warning mat obtained by the process of claim 14, wherein the step of preparing the mixture includes:
  mixing cement, resin, and bonding agents to form the mixture; and
  adding a color pigment to the mixture.

19. The patterned warning mat obtained by the process of claim 14, wherein the process further includes coloring the warning mat with a color pigment having a desired color, wherein the step of preparing the mixture includes mixing cement, resin, and bonding agents to form the mixture.

* * * * *